J. W. HYATT.

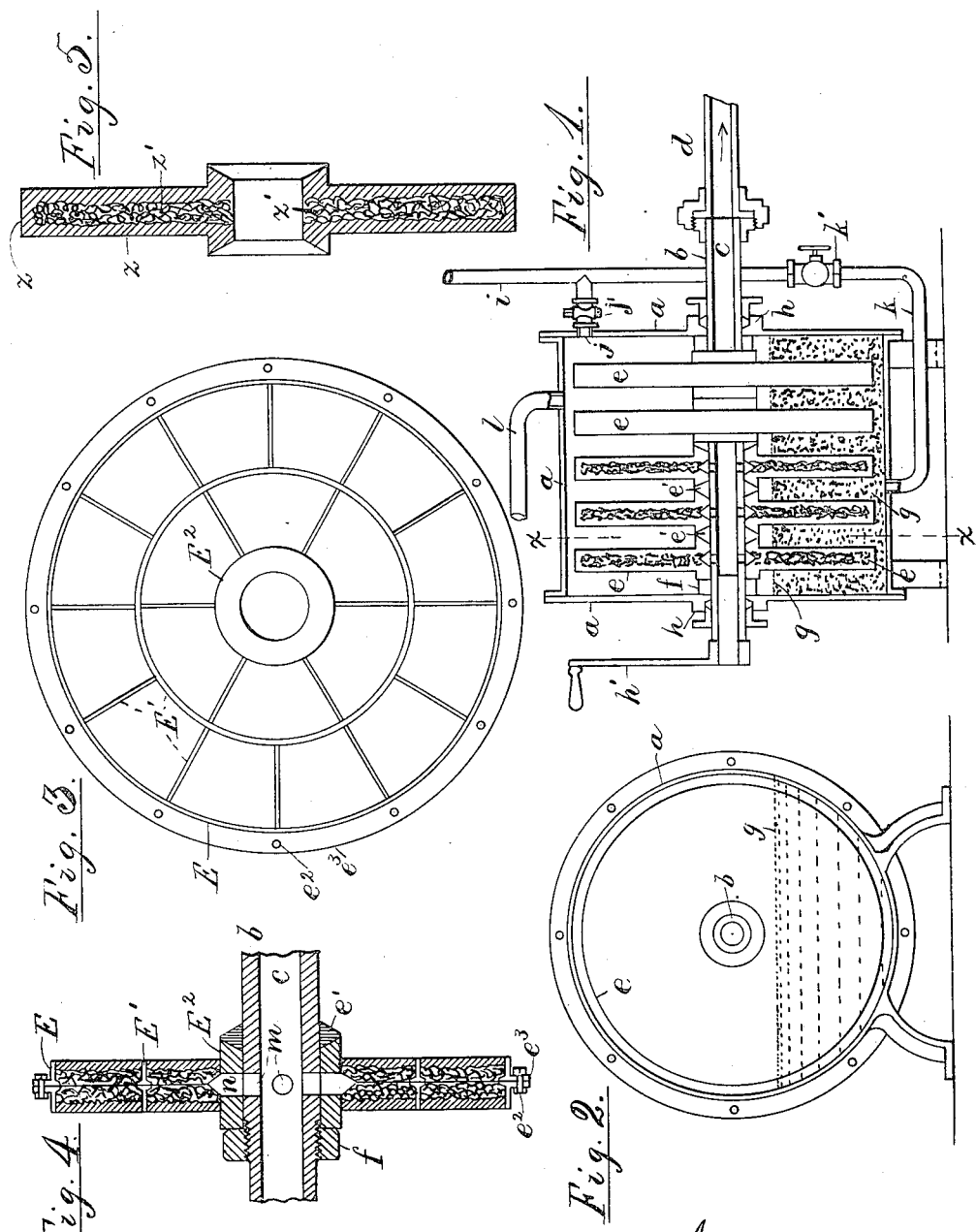
(No Model.) 3 Sheets—Sheet 1.
J. W. HYATT.
APPARATUS FOR CLEANSING FILTERING SURFACES.
No. 364,933. Patented June 14, 1887.
Attest:
L. Lee
Henry J. Miller
Inventor.
John W. Hyatt per
Crane & Miller, Attys (No Model.) 3 Sheets—Sheet 2.

APPARATUS FOR CLEANSING FILTERING SURFACES.

No. 364,933. Patented June 14, 1887.

Attest:
L. Lee,
F. C. Fischer.

Inventor.
John W. Hyatt, per
Crane & Miller, Attys.

(No Model.)  3 Sheets—Sheet 3.

J. W. HYATT.
APPARATUS FOR CLEANSING FILTERING SURFACES.

No. 364,933. Patented June 14, 1887.

Attest:
L. Lee.
Henry J. Miller

Inventor.
John W. Hyatt per
Crane & Miller, Attys.

UNITED STATES PATENT OFFICE.

JOHN W. HYATT, OF NEWARK, NEW JERSEY.

APPARATUS FOR CLEANSING FILTERING-SURFACES.

SPECIFICATION forming part of Letters Patent No. 364,933, dated June 14, 1887.

Application filed November 23, 1886. Serial No. 219,574. (No model.)

*To all whom it may concern:*

Be it known that I, JOHN W. HYATT, a citizen of the United States, residing at Newark, Essex county, New Jersey, have invented certain new and useful Improvements in Apparatus for Cleansing Filtering Surfaces, fully described and represented in the following specification and the accompanying drawings, forming a part of the same.

My invention consists in a means of abrading and cleansing the surface of a solid filtering-diaphragm by motion in relation to loose granular abrading material, the substance of the latter being held against the surface of the diaphragm by the unfiltered fluid, and its loose particles operating to scour such surface in the manner desired.

My invention also consists in a particular construction for a filtering-diaphragm.

The first part of my invention may be practiced with diaphragms of porous stone or other suitable substances; but in practicing the latter part of my invention I employ a diaphragm of an artificial composition having a layer of finer particles upon its inlet side, forming fine interstices to arrest the impurities, and a layer of coarser particles upon its outlet side to more readily and rapidly collect the water which percolates through the diaphragm. The diaphragm may be of flat or tubular form; but I prefer the former shape, as my construction enables me to construct disks or plates whose whole area operates as a filtering medium, and which may be arranged to present a very large filtering-surface within a small casing. Such a flat diaphragm is formed by placing in the bottom of a suitable mold or frame a layer of any suitable cement mixed with coarser granules, and applying to the surface of such mixture a layer of finer grain.

Figure 6:
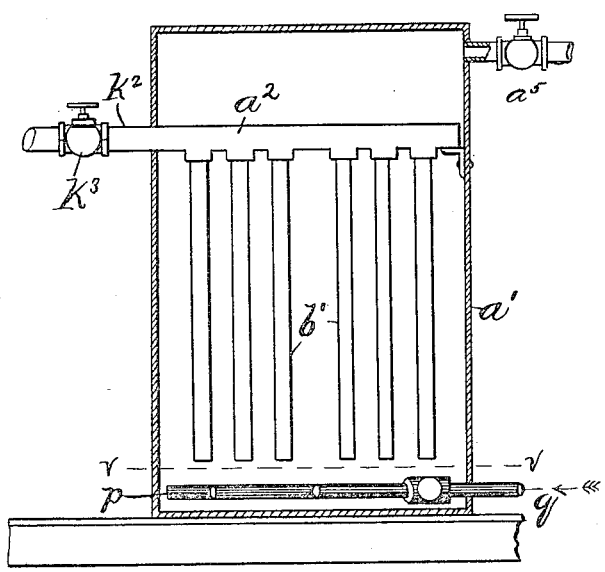
Figure 8:
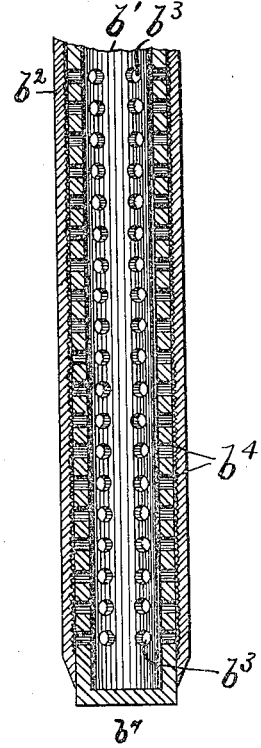
Figure 7:
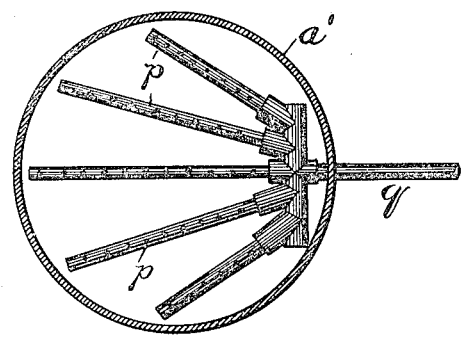
Figure 9:
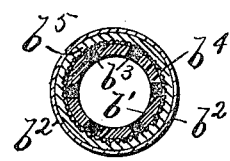
Figure 10:
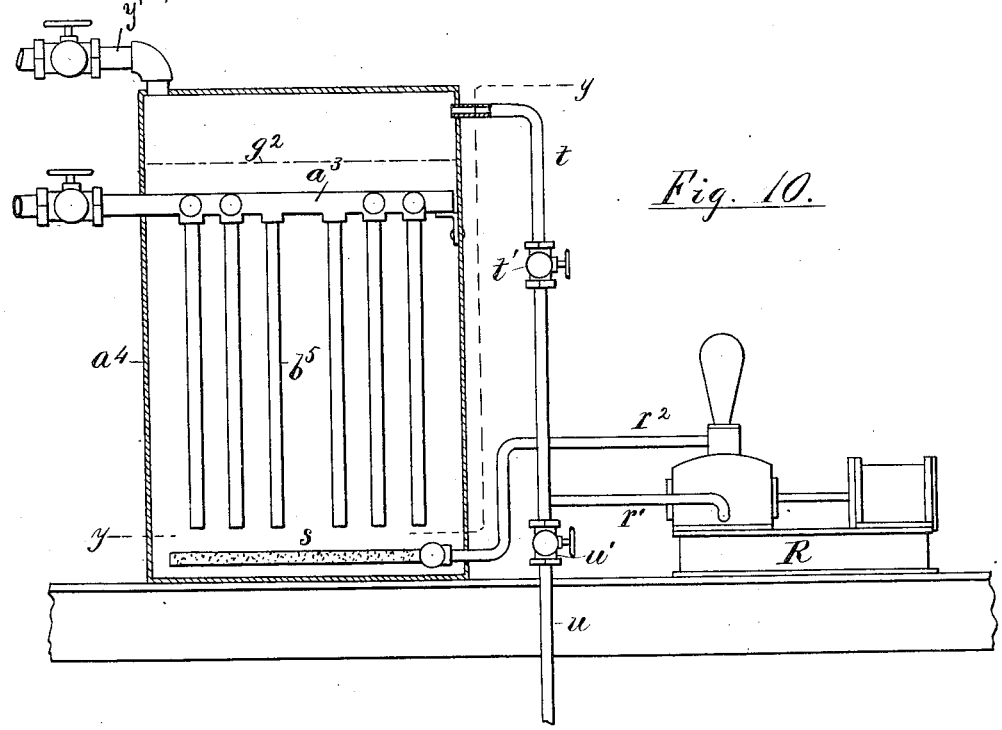
Figure 11:
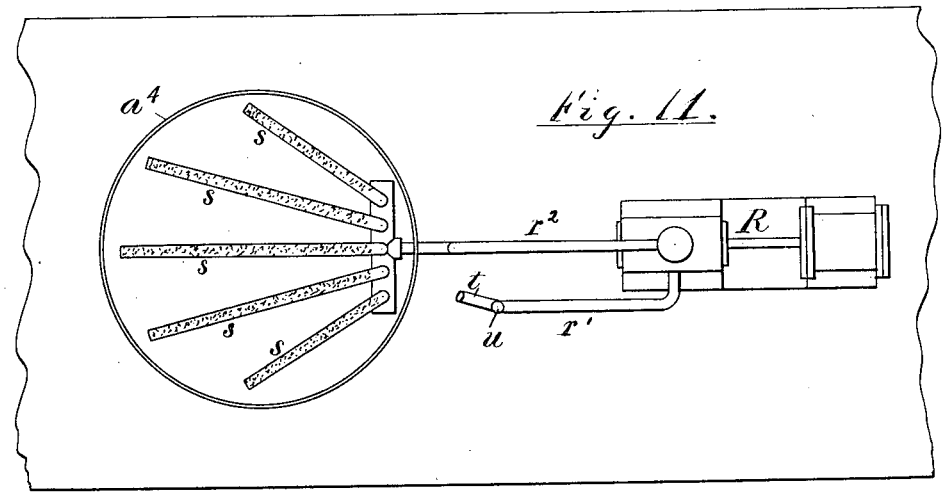

My improvements will be understood by reference to the annexed drawings, in which Figure 1 is a longitudinal section of a filter provided therewith, a portion of the disks and central shaft not being shown in section. Fig. 2 is a transverse section of the same on line $x$ $x$ in Fig. 1. Fig. 3 is an enlarged side view of one of the disks. Fig. 4 is a transverse section of the same with a portion of the central shaft, and Fig. 5 is a similar section of a disk constructed without any iron frame. Fig. 6 is an elevation of a cylindrical filter, showing the diaphragms as pendent tubes, the casing being shown in section to expose its contents. Fig. 7 is a plan of the same below the line $v v$ in Fig. 6. Fig. 8 is a vertical section of one of the filter-tubes $b'$. Fig. 9 is a transverse section of the same. Fig. 10 is an elevation of an alternative construction; and Fig. 11 is a plan of the same in section on line $y y$, Fig. 10.

In Figs. 1 and 2, $a$ is the filter-casing; $b$, the central shaft, with bore $c$ connected at one end by a swivel with a discharge-pipe, $d$, for the purified water.

$e$ are the filtering-disks, formed separately and clamped together upon the shaft with intermediate india-rubber gaskets, $e'$, by means of nuts $f$.

$g$ is sand placed in the lower part of the casing and covers a portion of each disk.

$h$ are stuffing-boxes applied to the casing near the ends of the shaft, and $h'$ is a crank to rotate the same and turn the disks around within the casing in contact with the loose abrading material.

$i$ is the water-supply pipe, having a branch, $j$, admitting water to the casing above the sand, and a branch, $k$, admitting the water to the bottom of the casing, so as to pass through the sand in its flow.

$l$ is an overflow waste-pipe at the top of the casing. The disks being separated from one another, it is obvious that both the flat sides of each disk are exposed to the unfiltered water, and as the disks, by my process of construction, are furnished with internal outlets, it is obvious that the entire external surface of the disks forms a filtering diaphragm or medium by which the water is purified, and through which it passes to the bore of the shaft $b$, by which it is discharged to the pipe $d$. The impurities which gradually collect upon the filtering-surfaces of the disks may be readily removed by rotating the disks, and thus moving the surfaces in contact with the loose abrading material which lies between them in the lower part of the casing.

When filtering, the water may be admitted through either the branch $j$ or $k$, cocks $j'$ and $k'$ being provided in such branches to determine the flow. When the impurities accumulate in the filter, they may be discharged with a part of the fluid by the waste-pipe $l$, and the fluid may flow continuously from such pipe to carry off the impurities; or a cock may be applied to the pipe and the discharge made intermittent. The agitation of the filtering-surfaces against the loose abrading material is claimed in my patent applications No. 232,238, filed March 24, 1887, and No. 235,320, filed April 19, 1887; but it is obvious that with the same construction the disks may remain stationary and the abrading material be agitated by the inflowing current of water, if admitted below the sand by the branch pipe $k$.

Two different constructions for the disks are shown in Figs. 3, 4, and 5, Fig. 5 showing a disk composed wholly of porous composition. The entire outer surface of this disk is composed of a layer of fine-grained material, $z$, forming the filtering-diaphragm, and the inner substance of the disk being composed of coarser grain, $z'$, to permit the passage to the center of the diaphragm of the water which percolates through the outer layer. Such disk is made in one piece in a suitable mold, but may be made in any convenient manner.

I have devised various means for producing a porous composition artificially, but have not described their constitution herein, as I have filed separate patent applications, No. 221,678, filed December 15, 1886, and No. 222,006, filed December 18, 1886, therefor.

The formation of a disk in one solid piece is adapted for a disk of moderate dimensions; but Figs. 3 and 4 illustrate a means of forming disks of many feet diameter, with an iron frame of sufficient strength to resist the water pressure.

In this construction the composition is molded upon the iron frame, and it is obvious that in such a union of iron and composition changes of temperature in the water might cause a loosening of the composition from the frame by the expansion and contraction of the latter. To prevent such a separation of the composition from the iron, which might permit leakage through the various joints, I reticulate the iron frame and apply the composition separately to the various sections of the same. By this means the difference in the expansion of the iron on the composition is limited to much smaller areas and the liability to separation is greatly diminished.

In Figs. 3 and 4 the disk is shown formed of two iron circular frames, E, provided with ribs and cross-bars E', between which the composition $z z'$ is applied, and the frames are secured together at their periphery by bolts $e^2$, inserted through marginal flanges $e^3$. The hub $E^2$ is formed with holes $n$, coinciding with the channel formed by the two layers of coarse composition $z'$, and the shaft $b$ is provided with similar holes, $m$, to receive the liquid discharged from the holes $n$. By this construction the disk possesses two filtering-diaphragms upon its parallel surfaces, and the water passed through the outer fine layers, $z$, is collected in the interstices of the coarser layer $z'$, and discharged as in the solid disk in Fig. 5. When the two diaphragms are not thus combined together, the substance is sustained upon any surface adapted to furnish an outlet for the fluid—as a perforated plate, tube, or screen of any kind.

My invention may be practiced in many other constructions, of which I have illustrated one modification in Figs. 6 to 9, inclusive, in which the diaphragm formed of coarse and fine layers of composition is shown in tubular form. The tube $b'$ (shown in Figs. 8 and 9) is formed of metal with numerous coarse perforations, $b^3$. Wire-netting (indicated by a fine zigzag line, $b^4$) is wrapped around the pipe to keep the composition from penetrating the holes, and the filtering composition $b^2$ is then applied over the wire-netting, to which it strongly adheres, as in Fig. 8. In Fig. 6 such tubes are shown suspended in a casing, $a'$, from a branch pipe, $a^2$, connected with a discharge-pipe, $k^2$, having a stop-cock, $k^3$.

In practice the pipe $a^2$ would be provided with branches extending horizontally in the head of the casing, so that the suspended tubes $b'$ would fill the body of the casing as nearly as possible. Sand, coke, pumice-stone, or other abrading material would be placed in the casing $a'$ around the tubes $b'$, and the fluid would be admitted through an inlet-pipe, $q$, provided with branches $p$, extended within the bottom of the casing and perforated to diffuse the fluid beneath all the filter-tubes. A volume of fluid sufficient to agitate the sand could be supplied through the pipe $q$ continuously, and the surplus would escape continuously through the waste-cock $a^5$; or a volume only sufficient to pass through the filter-diaphragms without agitating the sand could be introduced and a greater volume admitted at intervals to actuate the abrading material and simultaneously carry off the impurities. The sand would thus be agitated to cleanse the filter-tubes in the desired manner, and the surplus fluid be discharged from the waste-cock $a^5$ continuously or intermittently, as preferred. The tubes $b'$ are closed at their ends, as shown at $b^7$ in Fig. 8, and the water is therefore compelled to percolate through the coating $b^2$ and to reach the holes $b^3$ through the interstices of the wire-netting $b^4$, in order to escape from the filter by the pipe $k^2$.

When a force-pump is available to produce a strong current of water, the alternative construction shown in Figs. 10 and 11 may be used, in which the water is admitted to the whole bottom of the casing $a^4$ at once through perforated pipes $s$, and the excess of fluid, which cannot be passed through the tubes $b^5$, would be returned to the suction of the pump to again operate in washing the tubes. In these figures, R is the pump, $r'$ the suction-pipe, and $r^2$ the delivery, forcing the water into the pipes $s$. The suction-pipe has a branch, $u$, and cock $u'$, connecting with a water-supply, and a branch, $t$, with cock $t'$, connecting with the top of the casing $a^4$. The sand fills the casing to the line $g^2$ above the tube-header $a^3$, and is agitated in contact with all the filtering-tubes $b^5$, during the filtering operation, by the current from the supply-pipe $s$. A cock would be provided to discharge the foul water when required, as in the pipe $y'$ in Fig. 10, and the opening of such cock for a short time during the working of the filter would serve to discharge a portion of the contained liquid and carry off the impurities raised to the surface by the upward current from the pipes $s$.

In addition to the wire screen $b^4$, interposed between the filtering-diaphragm and the iron tube in Fig. 8, a layer of coarse granular composition may be first applied to the pipe, as at $b^5$ in Fig. 9, and the layer of finer-grained composition be applied outside the same, as in said figure. The water percolating through the fine-grained material would be collected in the interstices of the layer $b^5$, and would thus be more rapidly and freely conducted to the apertures $b^3$, leading to the interior of the tubes $b'$.

Having thus set forth my invention, it will be seen that all the forms illustrated may be employed to effect the cleansing of the filtering-diaphragm constantly while in use, the sand being agitated by the means described, and thereby abrading the surface of the filtering-diaphragm and removing therefrom the impurities which are separated from the water by the filtering operation.

The term "diaphragm" has been applied herein to constructions varying in form, but having in all cases the function of a wall, through which the water is required to pass to effect its purification, and the function of such diaphragm or wall is evidently exerted by its actual constitution independent of its form or the means by which it is supported in the construction. Thus in Fig. 5 the whole disk constitutes the filtering-diaphragm. In Fig. 4 the sections of composition sustained between the metallic ribs E also operate as the diaphragm, and the coating of composition upon the exterior of the tubes $b'$ (shown in Figs. 6, 8, and 9) also possesses the same function and serves as the diaphragm or wall herein claimed.

I am fully aware that it is not new to remove the deposit from the surface of a filtering plate or diaphragm by a brush, either the plate or the brush being moved in relation to the other during the filtering operation or at intervening periods.

I am also aware that various means have been employed, as in my previous patents, Nos. 273,542 and 273,543, for agitating granular material when used as the filtering medium, to remove the impurities deposited therein, and to abrade the surface of the particles or grains themselves by friction with one another to purify them effectually.

I am also aware that beds of filtering material of varying degrees of fineness have been heretofore used, and a current of water reversed through the same to agitate and purify them, and that it is not new to arrange two filtering-diaphragms adjacent to one another, with their outer surfaces exposed to the impure fluid, and a discharge-outlet provided between them to withdraw the filtered liquid.

I am also aware that it is not new to form a large diaphragm in sections of porous material affixed to a suitable frame or packing; but I am not aware that any solid porous composition has ever been made having a fine grain upon its inlet-surface to remove the impurities and a coarser grain upon its outlet-surface to collect and discharge the filtered fluid. Neither am I aware that any solid filtering-diaphragms, in any form, have ever been purified by the abrasion of granular particles agitated by a fluid-current in contact with the filtering-surface; nor that the fluid to be filtered has ever been operated to agitate an abrading agent upon the filtering-surface; nor that the space required for the collection of the water from a solid diaphragm has been minimized by forming a layer of coarse solid porous material upon the backs of two filter-diaphragms, and placing such coarse layers in contact to effect the discharge to a common outlet of the water collected from both.

I am aware that it is old to combine granular material with a solid diaphragm to form a combined filtering agent, as is shown in Fig. 11 of British Patent No. 2,126 of 1883, in which a mass of solid carbon is combined with the outlet from a filter-bed of granular material to operate upon the fluid in its passage from the filter-bed. In this construction the granular material forms a part of the filter-bed, and is not combined, as in my invention, with any means of agitating the granular material and the filter agent in relation to one another, so as to cleanse the latter by the abrasion of the former.

In said British patent the unfiltered fluid is admitted above the filter-bed or mass of granular material, and is not, in any case, introduced into it in such manner as to agitate or disintegrate the sand, or to abrade the block of carbon when filtering, as may be done in my construction, without suspending the filtering operation.

I wholly disclaim the said British patent and any apparatus unprovided with means for moving a solid filter-diaphragm and loose granular material in relation to one another to abrade the filtering-surfaces.

It is obviously immaterial how the agitation of the granular abrading material relative to the filter-diaphragms is effected, and the first claim in my present application is therefore intended to secure such improvement in a generic sense.

In my present application I have also claimed the current of inflowing fluid for agitating the abrading material as a specific means of carrying my generic invention into effect.

I have not claimed herein the construction shown in Figs. 10 and 11, as I have filed a separate patent application, No. 229,949, on March 7, 1887, to include such matter and other improvements. Neither have I claimed herein the means of moving the filter-diaphragms against the abrading material instead of agitating the loose material by a current of fluid, as I have claimed the same in a separate patent application, No. 232,238, filed March 24, 1887, "agitating filter-diaphragms." The proportion of abrading material that is mingled with the water is entirely immaterial in my present invention, as a limited number of particles diffused through the fluid may be employed in some cases; or the entire surface of the filtering-diaphragms may be covered with a mass of the abrading material, as in my patent application No. 229,505, filed March 3, 1887.

Having thus set forth my invention, what I claim herein is—

1. In a filter in which the filtration is performed by porous diaphragms, the combination, with such porous diaphragms, of loose particles of granular abrading material arranged movably in the unfiltered fluid in contact with the filtering surfaces of said diaphragms and means, substantially as described, for agitating the abrading material against such filtering-surfaces with the fluid to be filtered, to remove the impurities from such filtering-surfaces, substantially as herein set forth.

2. In a filter, the combination, with a porous diaphragm employed as a filtering agent, of loose particles of abrading material agitated in contact with the filtering-surface of such diaphragm by a current of fluid during the filtering operation, substantially as set forth.

3. A filtering-diaphragm composed of an artificial porous composition united into a solid mass having finer particles and finer interstices upon its inlet side, to which the unfiltered water is delivered, and coarser particles and interstices upon the outlet side, from which the filtered water is delivered, and by which it is collected and discharged to a common outlet.

4. In a filter, the combination, with a filtering-diaphragm formed of a porous composition united to form a solid mass, and having finer interstices upon its inlet side and coarser interstices upon its outlet side, as set forth, of means, substantially as set forth, for inclosing the diaphragm upon its outlet side, and an outlet for conducting the filtered water therefrom, substantially as herein set forth.

5. In a filter, the combination of two diaphragms, each formed of a porous composition united into a solid mass, having a finer grain upon one side to filter the fluid and a coarser grain upon the opposite side to collect and deliver the filtered water, the two diaphragms being secured with their coarser sides adjacent and provided with means to convey the filtered water from between the same, substantially as shown and described.

6. In a filter, the combination, with two reticulated metallic frames, of a porous composition secured separately in the openings of the two frames, means for attaching the edges of the frames tightly together to prevent the escape of fluid thereat, and means connected with the space between the frames for drawing the filtered water therefrom, substantially as shown and described.

7. In a filter, the combination, with two filtering-disks formed of composition, having a finer grain upon their outer surface and a coarser grain upon their inner side, as set forth, of a hollow shaft inserted through the centers of said disks, means for securing the edges of the disks together with their coarser sides adjacent to prevent the escape of fluid, means for securing the disks tightly upon the shaft and conveying the filtered water to its interior, and a casing to inclose the disks, as and for the purpose set forth.

8. In a filter, the combination, with two filtering-disks formed of composition having a finer grain upon their outer surface and a coarser grain upon their inner side, as set forth, of a hollow shaft inserted through the centers of said disks, means for securing the edges of the disks together with their coarser sides adjacent to prevent the escape of fluid, means for securing the disks tightly upon the shaft and conveying the filtered water to its interior, a casing to inclose the disks, and particles of abrading material deposited within the casing in contact with the filtering-surfaces of the disks, as and for the purpose set forth.

In testimony whereof I have hereunto set my hand in the presence of two subscribing witnesses.

JOHN W. HYATT.

Witnesses:
 W. R. SANDS,
 THOS. S. CRANE.